July 21, 1942.  H. VOLKS  2,290,658

ELECTRICAL HEATED COOKING GRILL

Filed Dec. 7, 1939  3 Sheets-Sheet 1

Inventor.
Herbert Volks.
by Parker & Carter
Attorneys.

July 21, 1942.　　　　　H. VOLKS　　　　　2,290,658
ELECTRICAL HEATED COOKING GRILL
Filed Dec. 7, 1939　　　3 Sheets-Sheet 2
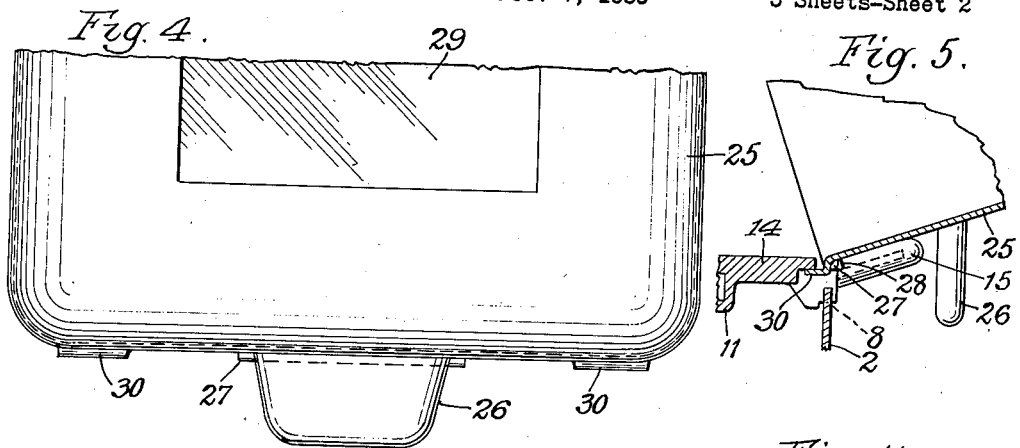
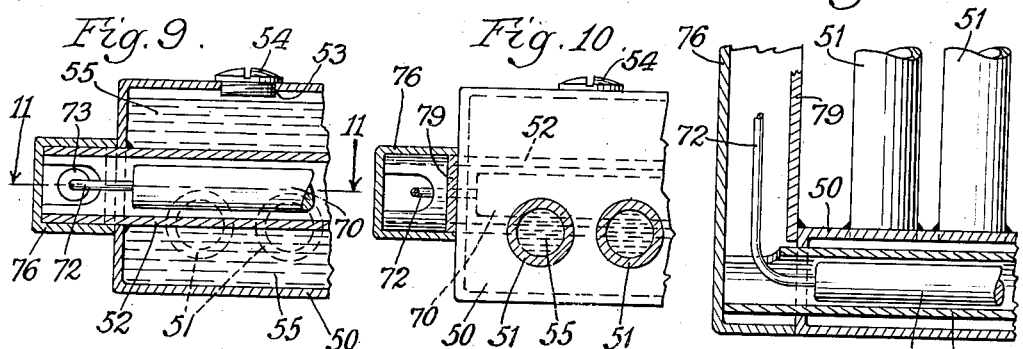
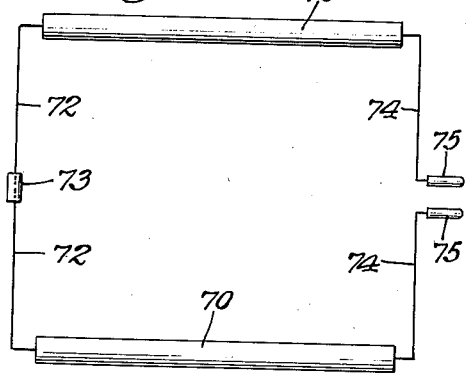
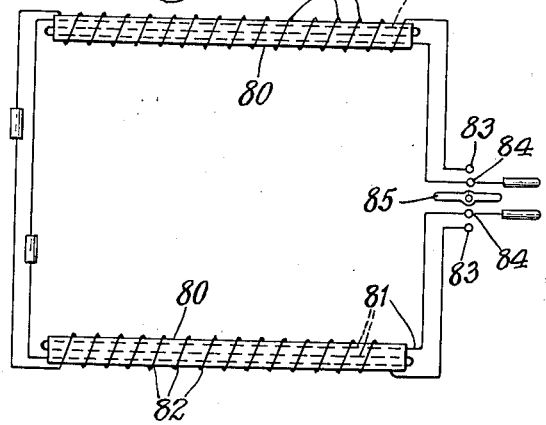
Inventor.
Herbert Volks.
by Parker & Carter
Attorneys.

July 21, 1942.　　　　　H. VOLKS　　　　　2,290,658
ELECTRICAL HEATED COOKING GRILL
Filed Dec. 7, 1939　　　3 Sheets-Sheet 3

Inventor.
Herbert Volks.
By Parker & Carter
Attorneys.

Patented July 21, 1942

2,290,658

UNITED STATES PATENT OFFICE 2,290,658

ELECTRICAL HEATED COOKING GRILL

Herbert Volks, Zurich, Switzerland, assignor to Sulzer Freres, Societe Anonyme, (also known as Sulzer Bros. Ltd.), Winterthur, Switzerland, a corporation of Switzerland Application December 7, 1939, Serial No. 307,959

3 Claims. (Cl. 219—19)

My invention relates to improvements in electrically heated cooking grills, and has for one object to provide a new and improved type of grill together with improved means for receiving and disposing of grease and juices discharged from the material being cooked. Another object is to provide a grill which will be especially well adapted to maintaining constant cooking temperatures. Another object is to provide a grill whereon the cooking temperature may be nicely and accurately controlled.

Other objects of my invention will appear from time to time in the specification and claims.

My invention is illustrated more or less diagrammatically in the accompanying drawings, wherein:

Figure 4 is a partial plan view of the cover.

Figure 5 is a section along the line 5—5 of Figure 1, showing the cover tilted.

Figure 9 is a section along the line 9—9 of Figure 7.

Figure 10 is a section along the line 10—10 of Figure 7.

Figure 11 is a section along the line 11—11 of Figure 9.

Figure 12 is a diagrammatic showing of the heating circuit.

Figure 13 is a diagrammatic showing of a different heating circuit.

Like parts are indicated by like characters in all figures.

Figure 1:
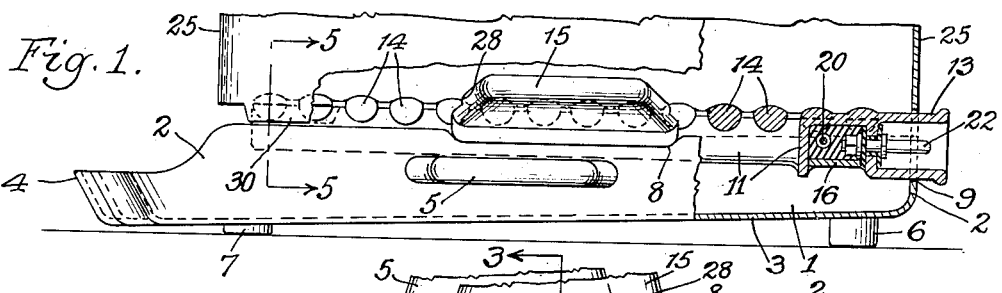
Figure 1 is a side elevation in part section with parts broken away and parts in section.
Figure 2:
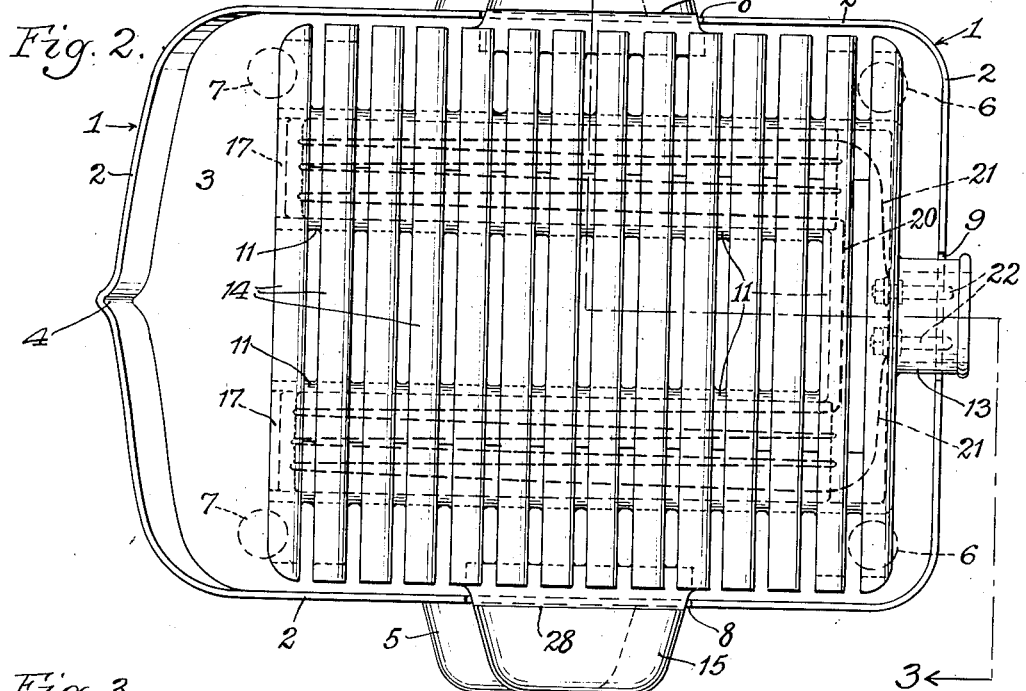
Figure 2 is a plan view with the cover removed.

1 is a combined support and grease pan. It includes a continuous peripheral wall 2, an inclined floor 3, a pouring lip 4, handles 5, and supporting legs 6 and 7. The peripheral wall 3 is notched at 8 on opposed sides and at 9 in opposition to the pouring lip.

The meat or food supporting grid itself comprises a U-shaped hollow or tubular structure 11, the upper surface of which is oppositely sloped roof fashion at 12 at the base of the U is an electric socket 13. Grid members 14 extend across the arms of the U, projecting therebeyond at each end, and are preferably cast integral with the hollow U member. The length of these arms is slightly less than the interior width of the pan 1. The socket 13 rests within notch 9. Handles 15, integral with some of the grid members 14 project laterally on both sides and rest in the sockets 8, so that the grid is supported in the frame at three points. The arms of the U are tubular, open at their free ends. The cross member of the U is open, but may be closed by any suitable closure 16. The arms of the U may be closed, by any suitable closure 17. 18—18 are heating elements including resistance coils 19 insulated as indicated. They may be inserted into the tubular arms of the U. Terminal conductors 20 within the base of the U join the two coils together and terminal conductors 21 are in electric connection with the contact pins 22 in the socket 13 whereby electric current may be sent through the heating coils to heat the grid members by conduction.

Figure 3:
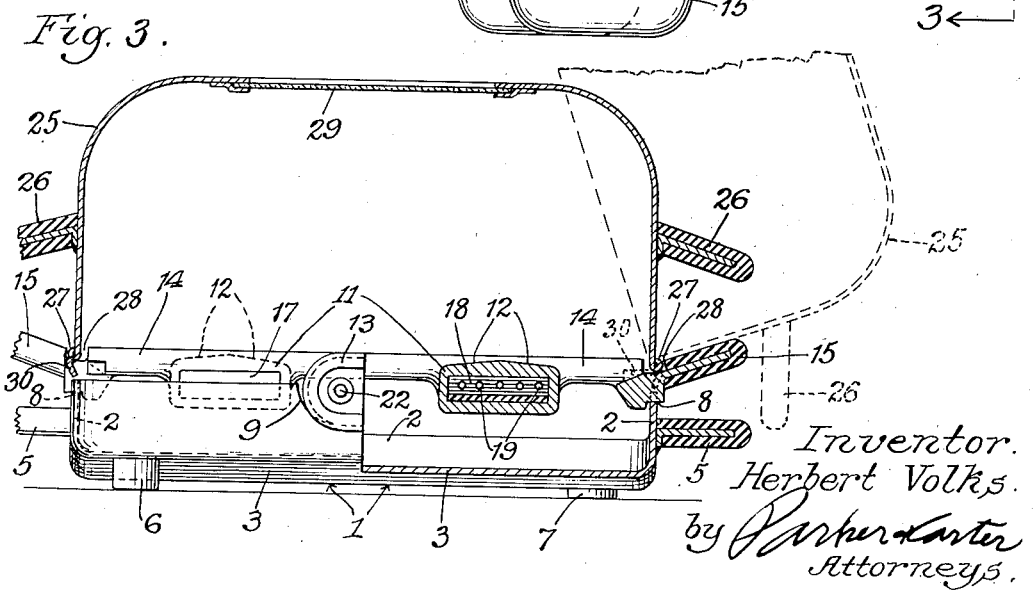
Figure 3 is a section along the line 3—3 of Figure 2.

25 is a cover having handles 26, the cover being adapted to rest upon the grid and cover it, and with the supporting frame enclose it. This cover is beaded at 27 to engage sockets 28 in the grid adjacent the grid handles 15 and is provided with a window 29. 30 are hooks adapted to limit the cover in its rotary uncovering movement as indicated in the Figure 5. There will preferably be a bead 27 and hooks 30 on each side of the cover so that the cover may be rotated in opposite directions and may rest in position being supported by the grid handle and hooks as indicated by the dotted lines in Figure 3 and the full lines in Figure 5. The cover may also be bodily removed, the hooks being substantially vertical to make this possible when the cover is not rotated.

The heating element itself nowhere comes in contact with the food to be cooked. The grid members are heated by conduction from two points, and are of sufficient cross section area so that when made of a material having a high heat conduction, there is a rapid heat flow, which results in a sufficiently uniform temperature of the entire length of the grid member.

Grease, juices and the like removed from the meat or material being cooked as a result of the heating action flow down through the space between the grids onto the inclined floor of the pan below the heating elements, thus smoking is reduced to the minimum. Anything dropped from the material being cooked onto the heating element flows off rapidly because of its sharp slope and such grease and juices are, therefore, concentrated at the lower end of the supporting pan, which serves as a grease well adjacent the pouring lip.

The grid itself with or without the cover in place may, if desired, be removed from the supporting pan.

Figure 6:
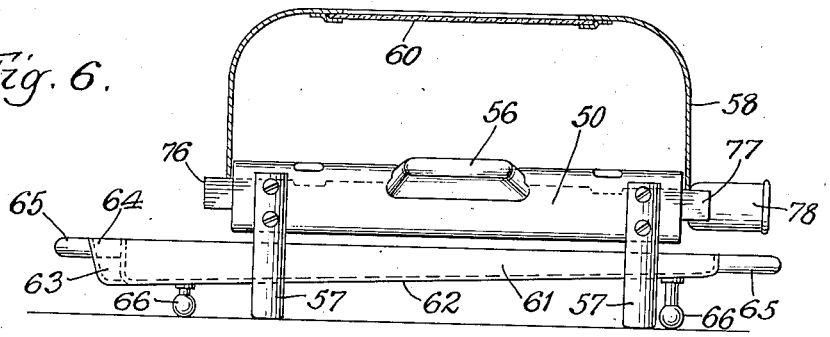
Figure 6 is a side elevation in part section of a different form of the grill.
Figure 7:
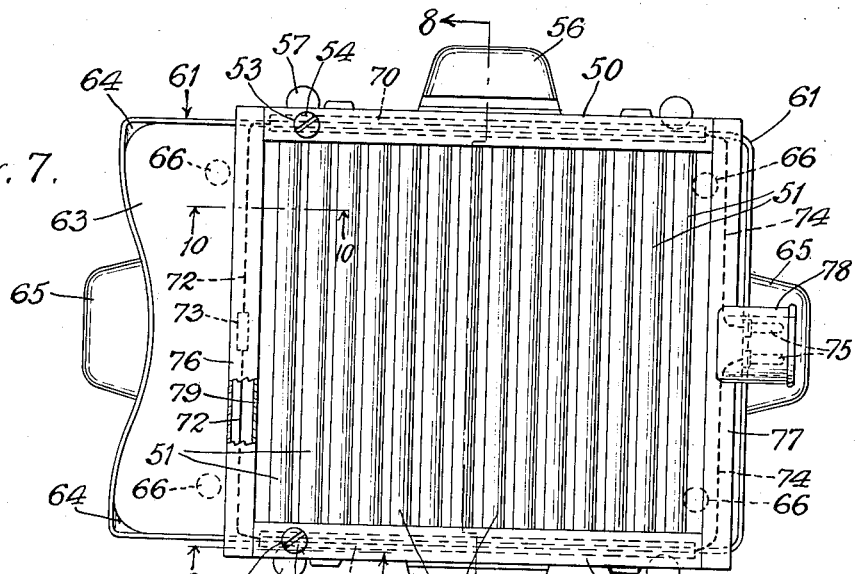
Figure 7 is a plan view in part section with parts removed.
Figure 8:
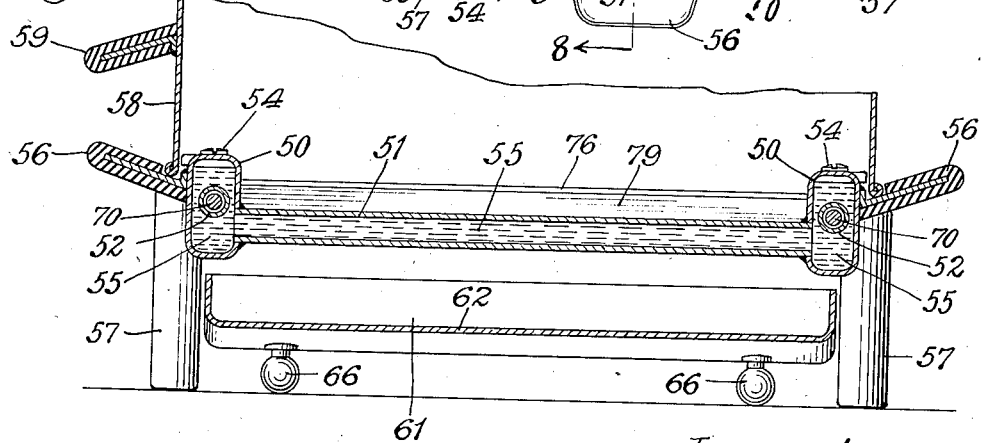
Figure 8 is a section along the line 8—8 of Figure 7.

In the modified form shown in Figure 6 and following, the grill comprises two hollow side members 59 joined by a series of grid tubes 51, which are in liquid tight connection with the tubular side members 50. Contained within the tubular side members 50 are tubes 52, which tubes make liquid-tight connections with the closed ends of the tubular members 50. 53 are filling openings closed by screw plugs 54 so that the grid and side member assembly may be filled with a fusible metal 55, which at cooking temperatures is molten. Handles 56 extend laterally from side members 50, and legs 57 extend downwardly from them. 58 is a cover, similar to the cover 25, having handles 59 and a window 60. This cover is related to the grill in the same way as the cover 25. 61 is a grease pan or tray, having a downwardly inclined floor 62 terminating in the grease well 63, with pouring lips 64, handles 65, and legs 66. 27 is so disposed that it may be placed beneath the electric grid member between the legs 57.

70 is a heating element in the tube 52. This element has a conductor 72 joined at 73 with a similar conductor 72 in the opposite tube 52. At their free ends each of these elements have conductors 72 communicating with the contact pins 75. A channel 76 joins the ends of the members 50 to enclose a conductor 72 and connector 73. The channel 77 joins the opposed ends of the members 50 and carries the socket 78 containing the contact pins 75 whereby the system may be supplied with electric current. The channels 76 and 77 are preferably closed by cover plates 79 removable so that the electrical connections can be made, and the channels are preferably removable so that the heating elements 70 can be replaced if necessary.

In the modified form shown in Figure 13, the heating element 80 has a coil inside, as indicated at 81, and a coil outside, as indicated at 82, the coils being insulated from one another and also from the walls of the tube 52. Thus, there are two heating circuits shown in Figure 13. These two heating circuits are associated with terminal pins 83 and 84, and the switch 85 in the position shown in Figure 13 only the inner heating coil is energized. If the switch is moved through an angle of 90 degrees, then both coils will be energized in parallel for increased heating.

The heating elements 70 and 80 are made of any suitable electric insulating material, preferably a good heat conductor.

When the device is cold, the metal 55 is solid. As the temperature rises when the current is applied to the heating element, the entire grid structure rises in temperature, being heated by conduction from the heat unit and the temperature continues to rise as the electric power is applied up to the point when the metal is completely fused and molten. Therefore, there is a temperature spread or a time spread within which even though additional power is applied to the grid, when there will be no change in temperature. As the heat continues, the metal will gradually become liquefied until it has all become molten. During this time the electric heat of fusion of the metal will result in the absorption of heat from the heating coil without a substantial increase in the temperature.

When the fusible metal is completely liquefied, heat can then be transferred by convection as well as conduction and more uniform heating throughout the entire area results.

I claim:

1. A cooking element for electric grills and the like comprising a U-shaped member, a plurality of spaced, parallel, heat-conducting, food-supporting grid bars, carried by the U-shaped member, and in heat conducting relation therewith, means within the U-shaped member for heating it, the U-shaped member having a sloping cover adapted to guide and deflect liquids which may drop thereupon, the U-shaped member being bounded on its underside by a plane surface parallel with the upper boundary of the food supporting grid bars.

2. A cooking element for electric grills and the like comprising a plurality of spaced parallel heat conducting food supporting grid bars, a hollow tubular member joining said grid bars integral with each of them, the upper surface of the tubular member being downwardly sloped in opposite directions from the center, the side surfaces of the tubular member being vertical, the bottom being horizontal and located well below the undersides of the food supporting grid bars.

3. A cooking element for electric grills and the like comprising a plurality of spaced parallel heat conducting food supporting grid bars, a hollow tubular member joining said grid bars integral with each of them, the upper surface of the tubular member being downwardly sloped in opposite directions from the center, the side surfaces of the tubular member being vertical, the bottom being horizontal and located well below the undersides of the food supporting grid bars, a handle projecting beyond the ends of the grid bars and integral with some of them.

HERBERT VOLKS.